United States Patent
Bergeal et al.

(10) Patent No.: US 11,280,240 B2
(45) Date of Patent: Mar. 22, 2022

(54) EXHAUST SYSTEM INCLUDING SCRF CATALYST WITH OXIDATION ZONE

(71) Applicants: David Bergeal, Royston (GB); Johnson Matthey Public Limited Company, London (GB)

(72) Inventors: David Bergeal, Royston (GB); Gavin Brown, Royston (GB); Valerie Houel, Royston (GB); Mark Walton, Royston (GB); Thilanka Wijemanne, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 17/043,322

(22) PCT Filed: Mar. 29, 2019

(86) PCT No.: PCT/IB2019/052596
§ 371 (c)(1),
(2) Date: Sep. 29, 2020

(87) PCT Pub. No.: WO2019/186485
PCT Pub. Date: Oct. 3, 2019

(65) Prior Publication Data
US 2021/0017889 A1 Jan. 21, 2021

Related U.S. Application Data

(60) Provisional application No. 62/649,614, filed on Mar. 29, 2018.

(51) Int. Cl.
*B01J 23/42* (2006.01)
*B01J 23/44* (2006.01)
*B01J 29/072* (2006.01)
*F01N 3/035* (2006.01)
*F01N 3/10* (2006.01)
*F01N 3/20* (2006.01)
*F01N 3/28* (2006.01)
*F01N 13/00* (2010.01)

(52) U.S. Cl.
CPC .............. *F01N 3/208* (2013.01); *B01J 23/42* (2013.01); *B01J 23/44* (2013.01); *B01J 29/072* (2013.01); *F01N 3/035* (2013.01); *F01N 3/106* (2013.01); *F01N 3/2825* (2013.01); *F01N 13/009* (2014.06); *F01N 2330/06* (2013.01); *F01N 2370/04* (2013.01); *F01N 2510/00* (2013.01); *F01N 2610/02* (2013.01); *F01N 2610/1453* (2013.01); *F01N 2900/1614* (2013.01)

(58) Field of Classification Search
CPC ............ B01D 46/2418; B01D 46/2476; B01D 53/9418; B01D 53/9422; B01D 53/944; B01D 53/9459; B01D 2251/206; B01D 2255/915; B01D 2255/9155; B01D 2255/904; B01D 2257/402; B01D 2257/404; B01D 2258/012; F01N 3/035; F01N 3/103; F01N 3/2066; F01N 2250/02; F01N 2570/14; F01N 2610/02
See application file for complete search history.

(56) References Cited

U.S. PATENT DOCUMENTS

| | | | |
|---|---|---|---|
| 9,132,386 B2 * | 9/2015 | Udd | F01N 3/035 |
| 10,718,245 B2 * | 7/2020 | Dou | F01N 3/103 |
| 11,008,917 B2 * | 5/2021 | Adelman | F01N 13/009 |
| 2009/0035195 A1 * | 2/2009 | Robel | F01N 13/011 422/177 |
| 2009/0260346 A1 | 10/2009 | Gekas et al. | |
| 2010/0175372 A1 | 7/2010 | Lambert et al. | |
| 2010/0180579 A1 | 7/2010 | Huang et al. | |
| 2011/0011067 A1 * | 1/2011 | Ren | F01N 3/2828 60/297 |
| 2012/0222411 A1 | 9/2012 | Yano et al. | |
| 2013/0095013 A1 * | 4/2013 | Banno | B01J 21/04 423/213.5 |
| 2014/0363358 A1 | 12/2014 | Udd et al. | |
| 2017/0051654 A1 | 2/2017 | Gupta et al. | |
| 2017/0198619 A1 * | 7/2017 | Huang | B01D 53/9409 |
| 2017/0298796 A1 | 10/2017 | Naseri et al. | |
| 2017/0341026 A1 | 11/2017 | Chen et al. | |

FOREIGN PATENT DOCUMENTS

| | | |
|---|---|---|
| CN | 102575544 A | 7/2012 |
| EP | 2230001 A1 | 9/2010 |
| GB | 2544858 A | 11/2016 |
| WO | 2012059144 A1 | 5/2012 |
| WO | 2012166833 A1 | 12/2012 |
| WO | 2016160915 A1 | 10/2016 |
| WO | 2017034470 A1 | 3/2017 |

* cited by examiner

*Primary Examiner* — Timothy C Vanoy

(57) ABSTRACT

Systems and methods of the present invention related to an exhaust gas purification system comprising: (a) a first injector for injecting ammonia or a compound decomposable to ammonia into the exhaust gas; (b) a diesel particulate filter including an inlet and an outlet, wherein the filter includes a selective catalyst reduction (SCR) catalyst and an oxidation catalyst; (c) a second injector for injecting ammonia or a compound decomposable to ammonia into the exhaust gas, located downstream of the filter; and (d) a downstream catalyst comprising a selective catalytic reduction catalyst, located downstream of the second injector.

16 Claims, 1 Drawing Sheet

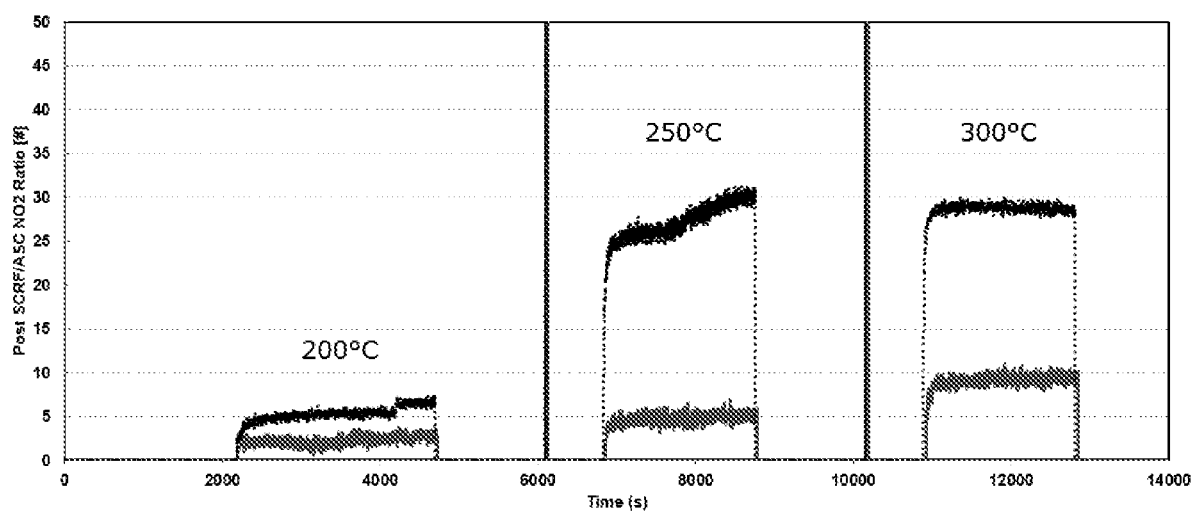

EXHAUST SYSTEM INCLUDING SCRF CATALYST WITH OXIDATION ZONE

BACKGROUND

The need to reduce the emission of harmful byproducts and the ever-increasing pressures to increase fuel economy are ongoing challenges with internal combustion engines. Diesel engines produce an exhaust emission that generally contains at least four classes of pollutant that are legislated against by inter-governmental organizations throughout the world: carbon monoxide (CO), unburned hydrocarbons (HCs), oxides of nitrogen ($NO_x$) and particulate matter (PM). A variety of emissions control devices exist for treating one or more of each type of pollutant. These emissions control devices are often combined as part of an exhaust system to ensure that all four classes of pollutant are treated before emission of the exhaust gas into the environment.

SUMMARY OF THE INVENTION

According to some embodiments of the present invention, an exhaust gas purification system includes: (a) a first injector for injecting ammonia or a compound decomposable to ammonia into the exhaust gas; (b) a diesel particulate filter including an inlet and an outlet, wherein the filter includes a selective catalyst reduction (SCR) catalyst and an oxidation catalyst; (c) a second injector for injecting ammonia or a compound decomposable to ammonia into the exhaust gas, located downstream of the filter; and (d) a downstream catalyst comprising a selective catalytic reduction catalyst, located downstream of the second injector.

In some embodiments, the oxidation catalyst is coated on the outlet of the filter. The oxidation catalyst may comprise one or more platinum group metals, such as platinum, palladium, or combinations thereof. A suitable selective catalytic reduction catalyst may include a metal oxide based SCR catalyst formulation, a molecular sieve based SCR catalyst formulation, or mixtures thereof.

In some embodiments, the downstream catalyst further comprises an ammonia oxidation catalyst. In some embodiments, the system further comprises an upstream catalyst located upstream of the filter, the upstream catalyst comprising a diesel oxidation catalyst, a $NO_x$ storage catalyst, or combinations thereof.

In certain embodiments, the exhaust gas entering the downstream catalyst has a $NO_2:NO_x$ ratio of more than 10%.

According to some embodiments of the present invention, a method of purifying exhaust gas includes: (a) adding ammonia or a compound decomposable into ammonia into the exhaust gas by a first injector; (b) passing the exhaust gas through a diesel particulate filter including an inlet and an outlet, wherein the filter includes a selective catalytic reduction (SCR) catalyst and an oxidation catalyst; (c) adding ammonia or a compound decomposable into ammonia into the exhaust gas by a second injector, located downstream of the filter; and (d) passing the exhaust gas through a downstream catalyst comprising a selective reduction catalyst, located downstream of the second injector.

BRIEF DESCRIPTION OF THE DRAWINGS

FIG. 1 shows $NO_2$ ratios post SCRF™ catalysts tested under Comparative System 1 and System 2.

DETAILED DESCRIPTION OF THE INVENTION

Systems and methods of the present invention relate to purification of an exhaust gas from an internal combustion engine. The invention is particularly directed to cleaning of an exhaust gas from a diesel engine.

Systems and methods of the present invention may include: (1) a first injector for injecting ammonia or a compound decomposable to ammonia into the exhaust gas, (2) a diesel particulate filter including a selective catalytic reduction (SCR) catalyst and an oxidation catalyst, (3) a second injector for injecting ammonia or a compound decomposable to ammonia into the exhaust gas, and (4) a downstream catalyst comprising a selective catalytic reduction catalyst, located downstream of the second injector. The oxidation catalyst may be located, for example, on the outlet side of the diesel particulate filter. In some embodiments, such system may include an upstream catalyst located upstream of the diesel particulate filter, the upstream catalyst comprising a diesel oxidation catalyst, a $NO_x$ storage catalyst, or combinations thereof.

Configurations of the system of the present invention have been found to provide lower overall tailpipe emissions. Including an oxidation catalyst in addition to the SCR catalyst on the diesel particulate filter may function to clean up secondary emissions, such as $NH_3$, CO, and hydrocarbons during filter regeneration. However, in embodiments of the present invention, the oxidation catalyst on the diesel particulate filter may also provide a benefit by making $NO_2$ to optimize the performance of the downstream SCR catalyst. It has also been found that the inclusion of the second reductant injector is necessary to realize these benefits, in order to supply the reductant necessary for the SCR reaction on the downstream SCR catalyst.

Details of the system components, configurations, and benefits are described in further detail herein.

Filter

Systems of the present invention include a filter comprising an SCR catalyst and an oxidation catalyst. Such filter may also be referred to herein as an SCRF™ catalyst with an oxidation catalyst. In some embodiments, the filter including the SCR catalyst and oxidation catalyst may be formulated and configured to provide a desired $NO_2/NO_x$ ratio in order to optimize the SCR reaction over the downstream SCR catalyst.

SCR Catalyst

Systems of the present invention may include one or more SCR catalyst. The system includes an SCR catalyst on a diesel particulate filter, as described above, and an SCR catalyst positioned downstream of the diesel particulate filter. Systems of the present invention may also include one or more additional SCR catalysts.

The exhaust system of the invention may include an SCR catalyst which is positioned downstream of an injector for introducing ammonia or a compound decomposable to ammonia into the exhaust gas. The SCR catalyst may be positioned directly downstream of the injector for injecting ammonia or a compound decomposable to ammonia (e.g. there is no intervening catalyst between the injector and the SCR catalyst).

The SCR catalyst includes a substrate and a catalyst composition. The substrate may be a flow-through substrate or a filtering substrate. When the SCR catalyst has a flow-through substrate, then the substrate may comprise the SCR catalyst composition (i.e. the SCR catalyst is obtained by extrusion) or the SCR catalyst composition may be disposed or supported on the substrate (i.e. the SCR catalyst composition is applied onto the substrate by a washcoating method).

When the SCR catalyst has a filtering substrate, then it is a selective catalytic reduction filter catalyst, which is referred to herein by the abbreviation "SCRF™ catalyst". The SCRF™ catalyst comprises a filtering substrate and the selective catalytic reduction (SCR) composition. References to use of SCR catalysts throughout this application are understood to include use of SCRF™ catalysts as well, where applicable.

The selective catalytic reduction composition may comprise, or consist essentially of, a metal oxide based SCR catalyst formulation, a molecular sieve based SCR catalyst formulation, or mixture thereof. Such SCR catalyst formulations are known in the art.

The selective catalytic reduction composition may comprise, or consist essentially of, a metal oxide based SCR catalyst formulation. The metal oxide based SCR catalyst formulation comprises vanadium or tungsten or a mixture thereof supported on a refractory oxide. The refractory oxide may be selected from the group consisting of alumina, silica, titania, zirconia, ceria and combinations thereof.

The metal oxide based SCR catalyst formulation may comprise, or consist essentially of, an oxide of vanadium (e.g. $V_2O_5$) and/or an oxide of tungsten (e.g. $WO_3$) supported on a refractory oxide selected from the group consisting of titania (e.g. $TiO_2$), ceria (e.g. $CeO_2$), and a mixed or composite oxide of cerium and zirconium (e.g. $Ce_xZr_{(1-x)}O_2$, wherein x=0.1 to 0.9, preferably x=0.2 to 0.5).

When the refractory oxide is titania (e.g. $TiO_2$), then preferably the concentration of the oxide of vanadium is from 0.5 to 6 wt % (e.g. of the metal oxide based SCR formulation) and/or the concentration of the oxide of tungsten (e.g. $WO_3$) is from 5 to 20 wt %. More preferably, the oxide of vanadium (e.g. $V_2O_5$) and the oxide of tungsten (e.g. $WO_3$) are supported on titania (e.g. $TiO_2$).

When the refractory oxide is ceria (e.g. $CeO_2$), then preferably the concentration of the oxide of vanadium is from 0.1 to 9 wt % (e.g. of the metal oxide based SCR formulation) and/or the concentration of the oxide of tungsten (e.g. $WO_3$) is from 0.1 to 9 wt %.

The metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$).

The selective catalytic reduction composition may comprise, or consist essentially of, a molecular sieve based SCR catalyst formulation. The molecular sieve based SCR catalyst formulation comprises a molecular sieve, which is optionally a transition metal exchanged molecular sieve. It is preferable that the SCR catalyst formulation comprises a transition metal exchanged molecular sieve.

In general, the molecular sieve based SCR catalyst formulation may comprise a molecular sieve having an aluminosilicate framework (e.g. zeolite), an aluminophosphate framework (e.g. AlPO), a silicoaluminophosphate framework (e.g. SAPO), a heteroatom-containing aluminosilicate framework, a heteroatom-containing aluminophosphate framework (e.g. MeAlPO, where Me is a metal), or a heteroatom-containing silicoaluminophosphate framework (e.g. MeAPSO, where Me is a metal). The heteroatom (i.e. in a heteroatom-containing framework) may be selected from the group consisting of boron (B), gallium (Ga), titanium (Ti), zirconium (Zr), zinc (Zn), iron (Fe), vanadium (V) and combinations of any two or more thereof. It is preferred that the heteroatom is a metal (e.g. each of the above heteroatom-containing frameworks may be a metal-containing framework).

It is preferable that the molecular sieve based SCR catalyst formulation comprises, or consist essentially of, a molecular sieve having an aluminosilicate framework (e.g. zeolite) or a silicoaluminophosphate framework (e.g. SAPO).

When the molecular sieve has an aluminosilicate framework (e.g. the molecular sieve is a zeolite), then typically the molecular sieve has a silica to alumina molar ratio (SAR) of from 5 to 200 (e.g. 10 to 200), preferably 10 to 100 (e.g. 10 to 30 or 20 to 80), such as 12 to 40, more preferably 15 to 30.

Typically, the molecular sieve is microporous. A microporous molecular sieve has pores with a diameter of less than 2 nm (e.g. in accordance with the IUPAC definition of "microporous" [see *Pure & Appl. Chem.*, 66 (8), (1994), 1739-1758)]).

The molecular sieve based SCR catalyst formulation may comprise a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or an intergrowth of two or more thereof. Preferably, the small pore molecular sieve has a framework structure represented by a FTC selected from the group consisting of CHA, LEV, AEI, AFX, ERI, LTA, SFW, KFI, DDR and ITE. More preferably, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI. When the small pore molecular sieve is a zeolite and has a framework represented by the FTC CHA, then the zeolite may be chabazite.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, –SVR, SZR, TER, TON, TUN, UOS, VSV, WEI and WEN, or a mixture and/or an intergrowth of two or more thereof. Preferably, the medium pore molecular sieve has a framework structure represented by a FTC selected from the group consisting of FER, MEL, MFI, and STT. More preferably, the medium pore molecular sieve has a framework structure represented by a FTC selected from the group consisting of FER and MFI, particularly MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. Preferably, the large pore molecular sieve has a framework structure represented by a FTC selected from the group consisting of AFI, BEA, MAZ, MOR, and OFF. More preferably, the large pore molecular sieve has a framework structure represented by a FTC selected from the group consisting of BEA, MOR and MFI. When the large pore molecular sieve is a zeolite and has a framework represented by the FTC BEA, FAU or MOR, then the zeolite may be a beta zeolite, faujasite, zeolite Y, zeolite X or mordenite.

In general, it is preferred that the molecular sieve is a small pore molecular sieve.

The molecular sieve based SCR catalyst formulation preferably comprises a transition metal exchanged molecular sieve. The transition metal may be selected from the group consisting of cobalt, copper, iron, manganese, nickel, palladium, platinum, ruthenium and rhenium.

The transition metal may be copper. An advantage of SCR catalyst formulations containing a copper exchanged molecular sieve is that such formulations have excellent low temperature $NO_x$ reduction activity (e.g. it may be superior to the low temperature $NO_x$ reduction activity of an iron exchanged molecular sieve). Systems and method of the present invention may include any type of SCR catalyst, however, SCR catalysts including copper ("Cu-SCR catalysts") may experience more notable benefits from systems of the present invention, as they are particularly vulnerable to the effects of sulfation. Cu-SCR catalyst formulations may include, for example, Cu exchanged SAPO-34, Cu exchanged CHA zeolite, Cu exchanged AEI zeolites, or combinations thereof.

The transition metal may be present on an extra-framework site on the external surface of the molecular sieve or within a channel, cavity or cage of the molecular sieve.

Typically, the transition metal exchanged molecular sieve comprises an amount of 0.10 to 10% by weight of the transition metal exchanged molecular, preferably an amount of 0.2 to 5% by weight.

In general, the selective catalytic reduction catalyst comprises the selective catalytic reduction composition in a total concentration of 0.5 to 4.0 g in$^{-3}$, preferably 1.0 to 3.0 g in$^{-3}$.

The SCR catalyst composition may comprise a mixture of a metal oxide based SCR catalyst formulation and a molecular sieve based SCR catalyst formulation. The (a) metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$) and (b) the molecular sieve based SCR catalyst formulation may comprise a transition metal exchanged molecular sieve.

When the SCR catalyst is an SCRF™ catalyst, then the filtering substrate may preferably be a wall flow filter substrate monolith, such as described herein in relation to a catalyzed soot filter. The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%.

The uncoated wall flow filter substrate monolith typically has a mean pore size of at least 5 µm. It is preferred that the mean pore size is from 10 to 40 µm, such as 15 to 35 µm, more preferably 20 to 30 µm.

The wall flow filter substrate may have a symmetric cell design or an asymmetric cell design.

In general for an SCRF™ catalyst, the selective catalytic reduction composition is disposed within the wall of the wall-flow filter substrate monolith. Additionally, the selective catalytic reduction composition may be disposed on the walls of the inlet channels and/or on the walls of the outlet channels.

Oxidation Catalyst

Systems of the present invention may include a filter including an SCR catalyst and an oxidation catalyst. In some embodiments, the oxidation catalyst is coated on the outlet of the filter. In some embodiments, the filter including the SCR catalyst and oxidation catalyst may be formulated and configured to provide a desired $NO_2/NO_x$ ratio in order to optimize the SCR reaction over the downstream SCR catalyst. The oxidation catalyst may be 1) coated on the filter such that it is positioned on the surface of the walls, inlet or outlet, 2) coated on the porous walls such that it permeates the filter, i.e., it is positioned within the filter; or 3) coated so that it is both within the porous filter walls and on the surface of the walls.

In some embodiments, the oxidation includes one or more platinum group metals. In some embodiments, the oxidation catalyst is formulated with a focus on oxidizing NO into $NO_2$; this may address the $NO_2$ slipping the SCR catalyst on the filter, and obtain a more favorable $NO_2:NO_x$ ratio for the downstream SCR reaction.

Ammonia Oxidation Catalyst

Systems of the present invention may include one or more ammonia oxidation catalysts, also called an ammonia slip catalyst ("ASC"). One or more ASC may be included downstream from an SCR catalyst, to oxidize excess ammonia and prevent it from being released to the atmosphere. In some embodiments the ASC may be included on the same substrate as an SCR catalyst. In certain embodiments, the ammonia oxidation catalyst material may be selected to favor the oxidation of ammonia instead of the formation of $NO_x$ or $N_2O$. Preferred catalyst materials include platinum, palladium, or a combination thereof, with platinum or a platinum/palladium combination being preferred. Preferably, the ammonia oxidation catalyst comprises platinum and/or palladium supported on a metal oxide. Preferably, the catalyst is disposed on a high surface area support, including but not limited to alumina.

In some embodiments, an ammonia oxidation catalyst comprises a platinum group metal on a siliceous support. A siliceous material may include a material such as: (1) silica; (2) a zeolite with a silica-to-alumina ratio of at least 200; and (3) amorphous silica-doped alumina with SiO2 content ≥40%. In some embodiments, a siliceous material may include a material such as a zeolite with a silica-to-alumina ratio of at least 200; at least 250; at least 300; at least 400; at least 500; at least 600; at least 750; at least 800; or at least 1000. In some embodiments, a platinum group metal is present on the support in an amount of about 0.5 wt % to about 10 wt % of the total weight of the platinum group metal and the support; about 1 wt % to about 6 wt % of the total weight of the platinum group metal and the support; about 1.5 wt % to about 4 wt % of the total weight of the platinum group metal and the support; about 10 wt % of the total weight of the platinum group metal and the support; about 0.5 wt % of the total weight of the platinum group metal and the support; about 1 wt % of the total weight of the platinum group metal and the support; about 2 wt % of the total weight of the platinum group metal and the support; about 3 wt % of the total weight of the platinum group metal and the support; about 4 wt % of the total weight of the platinum group metal and the support; about 5 wt % of the total weight of the platinum group metal and the support; about 6 wt % of the total weight of the platinum group metal and the support; about 7 wt % of the total weight of the platinum group metal and the support; about 8 wt % of the total weight of the platinum group metal and the support; about 9 wt % of the total weight of the platinum group metal and the support; or about 10 wt % of the total weight of the platinum group metal and the support.

In some embodiments, the siliceous support can comprise a molecular sieve having a BEA, CDO, CON, FAU, MEL, MFI or MWW Framework Type.

Reductant/Urea Injector

As described herein, systems of the present invention may include at least two reductant injectors. The system may include a means for introducing a nitrogenous reductant into the exhaust system upstream of the SCR and/or SCRF™ catalyst. It may be preferred that the means for introducing a nitrogenous reductant into the exhaust system is directly upstream of the SCR or SCRF™ catalyst (e.g. there is no intervening catalyst between the means for introducing a nitrogenous reductant and the SCR or SCRF™ catalyst).

The reductant is added to the flowing exhaust gas by any suitable means for introducing the reductant into the exhaust gas. Suitable means include an injector, sprayer, or feeder. Such means are well known in the art.

The nitrogenous reductant for use in the system can be ammonia per se, hydrazine, or an ammonia precursor selected from the group consisting of urea, ammonium carbonate, ammonium carbamate, ammonium hydrogen carbonate, and ammonium formate. Urea is particularly preferred.

The exhaust system may also comprise a means for controlling the introduction of reductant into the exhaust gas in order to reduce $NO_x$ therein. Preferred control means may include an electronic control unit, optionally an engine control unit, and may additionally comprise a $NO_x$ sensor located downstream of the NO reduction catalyst.

Substrate

Catalysts and adsorbers of the present invention may each further comprise a flow-through substrate or filter substrate. In one embodiment, the catalyst/adsorber may be coated onto the flow-through or filter substrate, and preferably deposited on the flow-through or filter substrate using a washcoat procedure.

The combination of an SCR catalyst and a filter is known as a selective catalytic reduction filter (SCRF™ catalyst). An SCRF™ catalyst is a single-substrate device that combines the functionality of an SCR and particulate filter, and is suitable for embodiments of the present invention as desired. Description of and references to the SCR catalyst throughout this application are understood to include the SCRF™ catalyst as well, where applicable.

The flow-through or filter substrate is a substrate that is capable of containing catalyst/adsorber components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval. The flow-through substrate may also be high porosity which allows the catalyst to penetrate into the substrate walls.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalyst/adsorber may be added to the flow-through or filter substrate by any known means, such as a washcoat procedure.

Upstream Catalyst

Systems of the present invention may include an upstream catalyst, located upstream of the filter including the SCR catalyst and oxidation catalyst. In some embodiments, the upstream catalyst may comprise a diesel oxidation catalyst, a $NO_x$ storage catalyst, or combinations thereof.

Diesel Oxidation Catalyst

Systems of the present invention may include one or more diesel oxidation catalysts. Oxidation catalysts, and in particular diesel oxidation catalysts (DOCs), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

$NO_x$ Storage Catalyst

Systems of the present invention may include one or more $NO_x$ storage catalysts. $NO_x$ storage catalysts may include devices that adsorb, release, and/or reduce $NO_x$ according to certain conditions, generally dependent on temperature and/or rich/lean exhaust conditions. $NO_x$ storage catalysts may include, for example, passive $NO_x$ adsorbers, cold start catalysts, $NO_x$ traps, and the like.

Passive $NO_x$ Adsorber

Systems of the present invention may include one or more passive $NO_x$ adsorbers. A passive $NO_x$ adsorber is a device that is effective to adsorb $NO_x$ at or below a low temperature and release the adsorbed $NO_x$ at temperatures above the low temperature. A passive $NO_x$ adsorber may comprise a noble metal and a small pore molecular sieve. The noble metal is preferably palladium, platinum, rhodium, gold, silver, iridium, ruthenium, osmium, or mixtures thereof. Preferably, the low temperature is about 200° C., about 250° C., or between about 200° C. to about 250° C. An example of a suitable passive $NO_x$ adsorber is described in U.S. Patent Publication No. 20150158019, which is incorporated by reference herein in its entirety.

The small pore molecular sieve may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons. Other metals (e.g., Fe, Ti, and Ga) may be incorporated into the framework of the small pore molecular sieve to produce a metal-incorporated molecular sieve.

Preferably, the small pore molecular sieve is selected from an aluminosilicate molecular sieve, a metal-substituted aluminosilicate molecular sieve, an aluminophosphate molecular sieve, or a metal-substituted aluminophosphate molecular sieve. More preferably, the small pore molecular sieve is a molecular sieve having the Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, as well as mixtures or intergrowths of any two or more. Particularly preferred intergrowths of the small pore molecular sieves include KFI-SIV, ITE-RTH, AEW-UEI, AEI-CHA, and AEI-SAV. Most preferably, the small pore molecular sieve is AEI or CHA, or an AEI-CHA intergrowth.

A suitable passive $NO_x$ adsorber may be prepared by any known means. For instance, the noble metal may be added to the small pore molecular sieve to form the passive $NO_x$ adsorber by any known means. For example, a noble metal compound (such as palladium nitrate) may be supported on the molecular sieve by impregnation, adsorption, ion-exchange, incipient wetness, precipitation, or the like. Other metals may also be added to the passive $NO_x$ adsorber. Preferably, some of the noble metal (more than 1 percent of the total noble metal added) in the passive $NO_x$ adsorber is located inside the pores of the small pore molecular sieve. More preferably, more than 5 percent of the total amount of noble metal is located inside the pores of the small pore molecular sieve; and even more preferably may be greater than 10 percent or greater than 25% or greater than 50 percent of the total amount of noble metal that is located inside the pores of the small pore molecular sieve.

Preferably, the passive $NO_x$ adsorber further comprises a flow-through substrate or filter substrate. The passive $NO_x$ adsorber is coated onto the flow-through or filter substrate, and preferably deposited on the flow-through or filter substrate using a washcoat procedure to produce a passive $NO_x$ adsorber system.

Cold Start Catalyst

Systems of the present invention may include one or more cold start catalysts. A cold start catalyst is a device that is effective to adsorb $NO_x$ and hydrocarbons (HC) at or below a low temperature and to convert and release the adsorbed $NO_x$ and HC at temperatures above the low temperature. Preferably, the low temperature is about 200° C., about 250° C., or between about 200° C. to about 250° C. An example of a suitable cold start catalyst is described in WO 2015085300, which is incorporated by reference herein in its entirety.

A cold start catalyst may comprise a molecular sieve catalyst and a supported platinum group metal catalyst. The molecular sieve catalyst may include or consist essentially of a noble metal and a molecular sieve. The supported platinum group metal catalyst comprises one or more platinum group metals and one or more inorganic oxide carriers. The noble metal is preferably palladium, platinum, rhodium, gold, silver, iridium, ruthenium, osmium, or mixtures thereof.

The molecular sieve may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons.

The molecular sieve may preferably be a small pore molecular sieve having a maximum ring size of eight tetrahedral atoms, a medium pore molecular sieve having a maximum ring size of ten tetrahedral atoms, or a large pore molecular sieve having a maximum ring size of twelve tetrahedral atoms. More preferably, the molecular sieve has a framework structure of AEI, MFI, EMT, ERI, MOR, FER, BEA, FAU, CHA, LEV, MWW, CON, EUO, or mixtures thereof.

The supported platinum group metal catalyst comprises one or more platinum group metals ("PGM") and one or more inorganic oxide carriers. The PGM may be platinum, palladium, rhodium, iridium, or combinations thereof, and most preferably platinum and/or palladium. The inorganic oxide carriers most commonly include oxides of Groups 2, 3, 4, 5, 13 and 14 elements. Useful inorganic oxide carriers preferably have surface areas in the range 10 to 700 m²/g, pore volumes in the range 0.1 to 4 mL/g, and pore diameters from about 10 to 1000 Angstroms. The inorganic oxide carrier is preferably alumina, silica, titania, zirconia, ceria, niobia, tantalum oxides, molybdenum oxides, tungsten oxides, or mixed oxides or composite oxides of any two or more thereof, e.g. silica-alumina, ceria-zirconia or alumina-ceria-zirconia. Alumina and ceria are particularly preferred.

The supported platinum group metal catalyst may be prepared by any known means. Preferably, the one or more platinum group metals are loaded onto the one or more inorganic oxides by any known means to form the supported PGM catalyst, the manner of addition is not considered to be particularly critical. For example, a platinum compound (such as platinum nitrate) may be supported on an inorganic oxide by impregnation, adsorption, ion-exchange, incipient wetness, precipitation, or the like. Other metals, such as iron, manganese, cobalt and barium, may also be added to the supported PGM catalyst.

A cold start catalyst of the present invention may be prepared by processes well known in the art. The molecular sieve catalyst and the supported platinum group metal catalyst may be physically mixed to produce the cold start catalyst. Preferably, the cold start catalyst further comprises a flow-through substrate or filter substrate. In one embodiment, the molecular sieve catalyst and the supported platinum group metal catalyst are coated onto the flow-through or filter substrate, and preferably deposited on the flow-through or filter substrate using a washcoat procedure to produce a cold start catalyst system.

$NO_x$ Traps

Systems of the present invention may include one or more $NO_x$ traps. $NO_x$ traps are devices that adsorb $NO_x$ under lean exhaust conditions, release the adsorbed $NO_x$ under rich conditions, and reduce the released NOx to form $N_2$.

A $NO_x$ trap of embodiments of the present invention may include a $NO_x$ adsorbent for the storage of $NO_x$ and an oxidation/reduction catalyst. Typically, nitric oxide reacts with oxygen to produce $NO_2$ in the presence of the oxidation catalyst. Second, the $NO_2$ is adsorbed by the $NO_x$ adsorbent in the form of an inorganic nitrate (for example, BaO or $BaCO_3$ is converted to $Ba(NO_3)_2$ on the $NO_x$ adsorbent). Lastly, when the engine runs under rich conditions, the stored inorganic nitrates decompose to form NO or $NO_2$ which are then reduced to form $N_2$ by reaction with carbon monoxide, hydrogen, and/or hydrocarbons (or via $NH_x$ or NCO intermediates) in the presence of the reduction catalyst. Typically, the nitrogen oxides are converted to nitrogen, carbon dioxide, and water in the presence of heat, carbon monoxide, and hydrocarbons in the exhaust stream.

The $NO_x$ adsorbent component is preferably an alkaline earth metal (such as Ba, Ca, Sr, and Mg), an alkali metal (such as K, Na, Li, and Cs), a rare earth metal (such as La, Y, Pr, and Nd), or combinations thereof. These metals are typically found in the form of oxides. The oxidation/reduction catalyst may include one or more noble metals. Suitable noble metals may include platinum, palladium, and/or rhodium. Preferably, platinum is included to perform the oxidation function and rhodium is included to perform the reduction function. The oxidation/reduction catalyst and the $NO_x$ adsorbent may be loaded on a support material such as an inorganic oxide for use in the exhaust system.

Filters

Systems of the present invention may include one or more particulate filters, in addition to the filter including the SCR catalyst and oxidation catalyst, as described above. Particulate filters are devices that reduce particulates from the exhaust of internal combustion engines. Particulate filters include catalyzed particulate filters and bare (non-catalyzed) particulate filters. Catalyzed particulate filters, also called catalyzed soot filters, (for diesel and gasoline applications) include metal and metal oxide components (such as Pt, Pd, Fe, Mn, Cu, and ceria) to oxidize hydrocarbons and carbon monoxide in addition to destroying soot trapped by the filter.

Fuel Injector

Systems of the present invention may include one or more fuel injectors. For example, a system may include a secondary fuel injector upstream of a diesel oxidation catalyst. Any suitable type of fuel injector may be used in systems of the present invention.

Embodiments/Systems

Systems of the present invention may include: (1) a first injector for injecting ammonia or a compound decomposable to ammonia into the exhaust gas; (2) a diesel particulate filter including an inlet and an outlet, wherein the filter includes a selective catalyst reduction (SCR) catalyst and an oxidation catalyst; (3) a second injector for injecting ammonia or a compound decomposable to ammonia into the exhaust gas, located downstream of the filter; and (4) a downstream catalyst comprising a selective catalytic reduction catalyst, located downstream of the second injector.

In some embodiments, the system includes an upstream catalyst, comprising a diesel oxidation catalyst, a $NO_x$ storage catalyst, or combinations thereof.

In some embodiments, the SCR catalyst and the oxidation catalyst are configured on the filter such that the exhaust gas contacts the SCR catalyst before contacting the oxidation catalyst. In some embodiments, the oxidation catalyst is coated on the outlet of the filter. In some embodiments, the SCR catalyst is on the inlet of the filter.

In some embodiments, the SCR catalyst is included in a layer which extends from the inlet end of the filter toward the outlet end, but does not overlap with the oxidation catalyst. In some embodiments, the SCR catalyst is included in a layer which extends from the inlet end of the filter and at least partially covers the oxidation catalyst. In some embodiments, the layer including the SCR catalyst completely covers the oxidation catalyst. In some embodiments, the layer including the SCR catalyst partially covers the oxidation catalyst. In some embodiments, the layer including the SCR catalyst covers about 0%; 5%; 7%; 10%; 15%; 20%; 25%; 30%; 35%; 40%; 45%; 50%; 55%; 60%; 65%; 70%; 75%; 80%; 85%; 90%; 95%; 100%; up to about 10%; about 5% to about 50%; about 20% to about 50%; about 25% to about 75%; or about 30% to about 70%; of the length of the oxidation catalyst.

In some embodiments, the oxidation catalyst is included in a bottom layer which extends the entire length of the filter substrate; and the SCR catalyst is included in a top layer which extends from the inlet end of the substrate, covering all or part of the oxidation catalyst layer.

Methods

A method of purifying exhaust gas may include: (1) adding ammonia or a compound decomposable into ammonia into the exhaust gas by a first injector; (2) passing the exhaust gas through a diesel particulate filter including an inlet and an outlet, wherein the filter includes an SCR catalyst and an oxidation catalyst; (3) adding ammonia or a compound decomposable into ammonia into the exhaust gas by a second injector, located downstream of the diesel particulate filter; and (4) passing the exhaust gas through a downstream catalyst comprising a selective reduction catalyst, located downstream of the second injector.

In some embodiments, the SCR catalyst and oxidation catalyst on the filter may be formulated and configured to provide a desired $NO_2/NO_x$ ratio in order to optimize the SCR reaction over the downstream SCR catalyst. In some embodiments, the exhaust gas exiting the filter with the SCR catalyst and oxidation catalyst has a $NO_2/NO_x$ ratio of more than 10%; preferably, at least 15%; more preferably at least 20%. In some embodiments, the exhaust gas exiting the filter with the SCR catalyst and oxidation catalyst has a $NO_2/NO_x$ ratio of 10% to 70%; preferably, 15% to 65%; more preferably, 20% to 60%. In some embodiments, the exhaust gas exiting the filter with the SCR catalyst and oxidation catalyst has a $NO_2/NO_x$ ratio of 15%-40% or 25% to 35%. In some embodiments, the exhaust gas exiting the filter with the SCR catalyst and oxidation catalyst has a $NO_2/NO_x$ ratio of 40%-70% or 40% to 60%.

Benefits

Configurations of the system of the present invention have been found to provide lower overall tailpipe emissions. Including an oxidation catalyst along with the SCR catalyst on the filter may function to clean up secondary emissions, such as $NH_3$, CO, and hydrocarbons during filter regeneration. However, in embodiments of the present invention, the oxidation catalyst on the diesel particulate filter may also provide a benefit by making $NO_2$ to optimize the performance of the downstream SCR catalyst. Generally, the $NO_2/NO_x$ ratio of the exhaust stream exiting a diesel particulate filter with an SCR catalyst (i.e. an SCRF™ catalyst)

may be very low, while the SCR reaction is best performed with a NO$_2$/NO$_x$ ratio of about 50%. In systems of the present invention, the oxidation catalyst on the diesel particulate filter may oxidize the NO slipping the SCR catalyst on the filter into NO$_2$, in order to obtain a more favorable NO$_2$/NO$_x$ ratio, and thereby enhance the performance of the downstream SCR catalyst.

It has also been found that the inclusion of the second reductant injector is necessary to realize these benefits, in order to supply the reductant necessary for the SCR reaction on the downstream SCR catalyst.

EXAMPLES

Comparative System 1: DOC+SCRF™ Catalyst

A system consisting of a DOC followed by a SCRF™ catalyst containing a Cu-zeolite based catalyst coated on to a silicon carbide wall flow filter (DPF) with a cells per square inch (CPSI) of approximately 300 and a wall thickness (WT) of approximately 12 mil.

System 2: DOC+SCRF™ Catalyst Containing a DOC Component

A system consisting of a DOC followed by a SCRF™ catalyst with oxidation layer consists of a similar Cu-zeolite based catalyst in Comparative System 1 and substrate composition with the addition of oxidation component as described in the specification.

Bench Testing on a V6-3L Engine

As shown in Table 1, the engine evaluation set points targeted temperatures were 200° C., 250° C. and 300° C. In achieving these temperature points different airflows, NO$_x$, HC and CO were produced by the engine. The amount of urea dosed over the SCRF™ catalyst was alpha 1.1.

TABLE 1

Steady State Test Conditions

| Temperature (° C.) | Mass Airflow (kg/hr) | NO$_x$ (ppm) | HC (ppm) | CO (ppm) | Pre SCRF™ Catalyst NO$_2$ Ratio (%) | Alpha |
|---|---|---|---|---|---|---|
| 200 | 182 | 100 | 225 | 375 | 20 | 1.1 |
| 250 | 90 | 55 | 200 | 600 | 18 | 1.1 |
| 300 | 129 | 125 | 105 | 285 | 12 | 1.1 |

As shown in FIG. 1, in Comparative System 1, the post SCRF™ catalyst (without oxidation zone) NO$_2$ ratio was <10% (solid line), under the steady state test conditions in Table 1. In contrast, under the same test conditions with System 2, from 250° C. onwards, the post SCRF™ catalyst with an oxidation zone has an NO$_2$ ratio of >10% (dotted line). As higher NO$_2$ ratio's result in improved NO$_x$ conversions (following fast SCR reaction), this would result in improved NO$_x$ conversions on the downstream SCR.

As used in this specification and the appended claims, the singular forms "a", "an" and "the" include plural referents unless the context clearly indicates otherwise. Thus, for example, reference to "a catalyst" includes a mixture of two or more catalysts, and the like.

The term "ammonia slip", means the amount of unreacted ammonia that passes through the SCR catalyst.

The term "support" means the material to which a catalyst is fixed.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

When a range, or ranges, for various numerical elements are provided, the range, or ranges, can include the values, unless otherwise specified.

The term "N$_2$ selectivity" means the percent conversion of ammonia into nitrogen.

The terms "diesel oxidation catalyst" (DOC), "diesel exotherm catalyst" (DEC), "NO$_x$ absorber", "SCR/PNA" (selective catalytic reduction/passive NOx absorber), "cold-start catalyst" (CSC) and "three-way catalyst" (TWC) are well known terms in the art used to describe various types of catalysts used to treat exhaust gases from combustion processes.

The term "platinum group metal" or "PGM" refers to platinum, palladium, ruthenium, rhodium, osmium and iridium. The platinum group metals are preferably platinum, palladium, ruthenium or rhodium.

The terms "downstream" and "upstream" describe the orientation of a catalyst or substrate where the flow of exhaust gas is from the inlet end to the outlet end of the substrate or article.

The invention claimed is:

1. An exhaust gas purification system comprising:
   a. a first injector for injecting ammonia or a compound decomposable to ammonia into the exhaust gas;
   b. a diesel particulate filter including an inlet and an outlet, wherein the filter includes a selective catalyst reduction (SCR) catalyst and an oxidation catalyst;
   c. a second injector for injecting ammonia or a compound decomposable to ammonia into the exhaust gas, located downstream of the filter; and
   d. a downstream catalyst comprising a selective catalytic reduction catalyst, located downstream of the second injector;
   wherein the oxidation catalyst is coated on the outlet of the filter.

2. The exhaust gas purification system of claim 1, wherein the oxidation catalyst comprises one or more platinum group metals.

3. The exhaust gas purification system of claim 1, wherein the oxidation catalyst comprises platinum, palladium, or combinations thereof.

4. The exhaust gas purification system of claim 1, wherein the selective catalytic reduction catalyst comprises a metal oxide based SCR catalyst formulation, a molecular sieve based SCR catalyst formulation, or mixtures thereof.

5. The exhaust gas purification system of claim 1, wherein the downstream catalyst further comprises an ammonia oxidation catalyst.

6. The exhaust gas purification system of claim 1, wherein the exhaust gas entering the downstream catalyst has a $NO_2:NO_x$ ratio of more than 10%.

7. The exhaust gas purification system of claim 1, further comprising an upstream catalyst located upstream of the filter, the upstream catalyst comprising a diesel oxidation catalyst, a $NO_x$ storage catalyst, or combinations thereof.

8. A method of purifying exhaust gas, comprising:
   a. adding ammonia or a compound decomposable into ammonia into the exhaust gas by a first injector;
   b. passing the exhaust gas through a diesel particulate filter including an inlet and an outlet, wherein the filter includes a selective catalytic reduction (SCR) catalyst and an oxidation catalyst;
   c. adding ammonia or a compound decomposable into ammonia into the exhaust gas by a second injector, located downstream of the filter; and
   d. passing the exhaust gas through a downstream catalyst comprising a selective reduction catalyst, located downstream of the second injector;
   wherein the oxidation catalyst is coated on the outlet of the filter.

9. The method of claim 8, wherein the oxidation catalyst comprises one or more platinum group metals.

10. The method of claim 8, wherein the oxidation catalyst comprises platinum, palladium, or combinations thereof.

11. The method of claim 8, wherein the selective catalytic reduction catalyst comprises a metal oxide based SCR catalyst formulation, a molecular sieve based SCR catalyst formulation, or mixtures thereof.

12. The method of claim 8, wherein the downstream catalyst further comprises an ammonia oxidation catalyst.

13. The method of claim 8, wherein the exhaust gas entering the downstream catalyst has a $NO_2:NO_x$ ratio of more than 10%.

14. The method of claim 8, further comprising an upstream catalyst located upstream of the filter, the upstream catalyst comprising a diesel oxidation catalyst, a $NO_x$ storage catalyst, or combinations thereof.

15. An exhaust gas purification system comprising:
   a. a first injector for injecting ammonia or a compound decomposable to ammonia into the exhaust gas;
   b. a diesel particulate filter including an inlet and an outlet, wherein the filter includes a selective catalyst reduction (SCR) catalyst and an oxidation catalyst;
   c. a second injector for injecting ammonia or a compound decomposable to ammonia into the exhaust gas, located downstream of the filter; and
   d. a downstream catalyst comprising a selective catalytic reduction catalyst, located downstream of the second injector;
   wherein the downstream catalyst further comprises an ammonia oxidation catalyst.

16. A method of purifying exhaust gas, comprising:
   a. adding ammonia or a compound decomposable into ammonia into the exhaust gas by a first injector;
   b. passing the exhaust gas through a diesel particulate filter including an inlet and an outlet, wherein the filter includes a selective catalytic reduction (SCR) catalyst and an oxidation catalyst;
   c. adding ammonia or a compound decomposable into ammonia into the exhaust gas by a second injector, located downstream of the filter; and
   d. passing the exhaust gas through a downstream catalyst comprising a selective reduction catalyst, located downstream of the second injector;
   wherein the downstream catalyst further comprises an ammonia oxidation catalyst.

* * * * *